United States Patent [19]

Hoppe et al.

[11] Patent Number: 4,970,247

[45] Date of Patent: Nov. 13, 1990

[54] AQUEOUS CELLULOSE ESTER DISPERSIONS AND THEIR PREPARATION

[75] Inventors: Lutz Hoppe, Walsrode; Wolfgang Koch; Erhard Lühmann, both of Bomlitz; Michael Piepho, Fallingbostel, all of Fed. Rep. of Germany

[73] Assignee: Wolff Walsrode Aktiengesellschaft, Walsrode, Fed. Rep. of Germany

[21] Appl. No.: 337,245

[22] Filed: Mar. 13, 1989

[30] Foreign Application Priority Data

Apr. 28, 1988 [DE] Fed. Rep. of Germany ....... 3814284

[51] Int. Cl.[5] ........................ C08L 89/00; C08L 1/10; C08L 1/20; C08L 1/12

[52] U.S. Cl. ........................................ 524/31; 524/32; 524/37; 524/38; 524/39; 524/40; 524/41

[58] Field of Search ........................ 524/31, 32, 33, 37, 524/38, 39, 40, 41

[56] References Cited

U.S. PATENT DOCUMENTS 3,953,386 4/1976 Murphy et al. .................... 526/320

FOREIGN PATENT DOCUMENTS 35669 9/1981 European Pat. Off. .

*Primary Examiner*—Nathan M. Nutter

*Attorney, Agent, or Firm*—Sprung Horn Kramer & Woods

[57] ABSTRACT

Improved cellulose ester dispersions in the aqueous phase contain dispersed particles which contain cellulose esters, a polymerized monomer A having a polymerizable double bond and a polymerized monomer B having at least two polymerizable double bonds.

10 Claims, No Drawings

AQUEOUS CELLULOSE ESTER DISPERSIONS AND THEIR PREPARATION

This invention relates to aqueous cellulose ester dispersions with improved ProPerties, to a process for their Preparation, to lacquers prepared from them and to substrates treated with the dispersions or lacquers according to the invention.

Lacquer systems containing little or no organic solvent are becoming increasingly important in the context of increased environmental awareness (see e.g. O. Luckert, Emissionsarm Lackieren, publishers C. R. Vincentz-Verlag, Hanover, 1987).

A process for the preparation of dispersions by the polymerisation of aqueous monomer-polymer emulsions is described in DE-A-No. 2 529 547. In this process, water, a surface active agent, at least one polymer such as a cellulose ester, and a monomer in which the polymer is soluble are mixed together to form an emulsion and then subjected to conditions under which the monomer polymerises within the droplets of emulsion. A homogeneous mixture of at least two linear polymers is formed in the particles. This process may be employed to produce inter alia dispersions of cellulose esters, in particular of nitrocellulose and linear polyacrylates present as a homogeneous mixture. These dispersions are not suitable as coating materials, e.g. for wood, since they do not dry as clear coatings without the aid of coalescing agents and have a low surface hardness which, for example, does not enable them to be rubbed down adequately.

To avoid this disadvantage of a coating which does not dry without cloudiness, DE-A No. 3 007 936 describes a process in which the aforesaid dispersion particles in addition contain resins modified with fatty acids. Although the cloudiness of the lacquer film was thereby reduced, the procedure still requires the use of solvents as coalescing agents in a proportion of at least 20 to 25% by weight in the dispersion lacquer ready for application.

It was an object of the present invention to provide improved low solvent or solvent free cellulose ester dispersions which would dry without cloudiness even without the aid of coalescing agents and have an improved surface hardness so that they could be excellently sanded.

The present invention relates to a polymer dispersion of an aqueous continuous phase in which are dispersed particles T containing a cellulose ester and polymerised monomers, characterised in that I. at least two polymerised monomers A and B are present together with the cellulose ester, at least in the core of the particles T, II. A is a monomer corresponding to the following formula containing a polymerisable double bond:

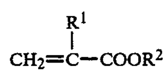

(I)

wherein

- $R^1$ denotes a hydrogen atom or an alkyl group with 1 to 4 carbon atoms, in particular methyl,
- $R^2$ denotes hydrogen, an alkyl group with 1 to 20 carbon atoms, a cycloalkyl group with 5 or 6 carbon atoms, a group of the formula $-(CHR^3-CHR^4-O)_n-R^5$, aryl, in particular phenyl, or aralkyl, in particular benzyl,
- $R^3$, $R^4$ and $R^5$ denote hydrogen or alkyl with 1 to 6 carbon atoms, in particular methyl or ethyl, and
- n stands for an integer with a value from 1 to 50, III. B is a monomer having at least two polymerisable double bonds and IV. the dispersion contains an emulsifier E.

The group $R^2$ may in turn be substituted. In a preferred embodiment, the substituent $R^2$ is substituted with a solubilizing group, in particular a sulpho group. 2-sulphoethyl is a particularly preferred group $R^2$. In another particularly preferred embodiment, $R^2$ is an alkyl group having 3 to 6 carbon atoms containing at least one OH group, in particular hydroxyethyl.

In a preferred embodiment, the particles T have a diameter of less than 10 $\mu m$, preferably less than 4 $\mu m$. Furthermore, the particles T of a preferred embodiment have cellulose esters and the polymerised monomers A and B uniformly distributed in the whole particle. In another preferred embodiment, the particles T consist of a core K and at least one sheath H which differs in its composition from K. In this case, cellulose esters, polymerised monomer B and at least part of the polymerised monomer A are preferably homogeneously distributed in the core of the particles. In another particularly preferred embodiment, the ratio of polymerised monomers A to polymerised monomers B is greater in the sheath H than in the core. The particles T may have several sheaths H of differing compositions or partly identical composition in addition to a core.

In another preferred embodiment, the dispersions according to the invention contain

- from 5 to 40 parts by weight, especially from 5 to 25 parts by weight of cellulose ester,
- from 5 to 55 parts by weight of polymerised monomer A,
- from 0 1 to 30 parts by weight of polymerised monomer B,
- from 0.2 to 10 parts by weight, especially from 0.5 to 5 parts by weight, of emulsifier E,
- at least 30 parts by weight of water,
- from 0 to 10, especially from 0 to 5 parts by weight of a resin,
- from 0 to 25, especially from 5 to 15 parts by weight of a plasticiser, and
- from 0 to 10, especially from 0 to 5 parts by weight of an organic solvent.

The invention further relates to a process for the preparation of a dispersion according to the invention, characterised in that the monomers A and B are polymerised in the aqueous phase in the presence of a cellulose ester and an emulsifier E.

Further, the invention relates to a process for the preparation of lacquers from the dispersions according to the invention with the addition of conventional lacquer components, especially lubricants, gloss improvers, levelling agents, pigments, fillers, resins, plasticisers and optionally solvents.

The polymerised monomers A may be partly replaced, preferably to an extent of up to 30% by weight, especially from 5 to 20% by weight, by at least one of the following monomers in polymerised form:

1. Styrene and/or substituted styrenes corresponding to the following general formula:

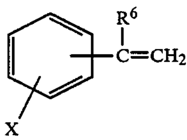

wherein $R^6$ denotes H or $CH_3$ and X denotes a hydrogen atom or a halogen atom (e.g. a chlorine or bromine atom) or a methyl group;

2. Vinyl esters such as vinyl acetate, vinyl propionate and/or vinyl butyrate, vinyl acetate being preferred;

3. Vinyl chloride and/or vinylidene chloride;

4. A monomer corresponding to the following general formula:

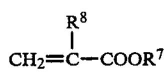

wherein $R^8$ denotes H or $CH_3$ and $R^7$ denotes an alkyl group with 3 to 6 carbon atoms containing at least one OH group;

5. Acrylonitrile, methacrylonitrile or acrylamide may also be present;

6. Reaction products of hydroxyethyl acrylate, hydroxypropyl acrylate, hydroxypropyl methacrylate or hydroxyethyl methacrylate with monoisocyanates or epoxides;

7. A compound containing allyl ether groups and only one polymerisable double bond.

The monomers B are monomers or prepolymers containing more than one polymerisable double bond per molecule of monomer or prepolymer, e.g. epoxy polyacrylates, polyester polyacrylates or polyurethane polyacrylates or the corresponding methacrylates or allyl ether-modified compounds.

The epoxy polyacrylates or methacrylates are preferably prepared from polyepoxide compounds having more than one 1,2-epoxide groups per molecule, preferably 2 to 6, in particular 2 or 3 1,2-epoxide groups, by reacting these compounds with acrylates.

The polyepoxide compounds to be used may be polyglycidyl ethers of polyvalent phenols, for example the polyglycidyl ethers of pyrocatechol, resorcinol, hydroquinone, 4,4'-dihydroxy-diphenyl methane, 4,4'-dihydroxy-3,3'-dimethyldiphenyl methane, 4,4'-dihydroxy-diphenyl-dimethyl methane (bisphenol A), 4,4'-dihydroxy-diphenyl methyl methane, 4,4'-dihydroxy-diphenyl cyclohexane, 4,4'-dihydroxy-3,3'-dimethyldiphenyl propane, 4,4'-dihydroxydiphenyl, 4,4'-dihydroxydiphenyl sulphone, tris-(4-hydroxyphenyl)-methane or of the chlorination or bromination products of the above mentioned diphenols, especially the polyglycidyl ethers of bisphenol A; furthermore, the polyglycidyl ethers of novolaks (i.e. of reaction products of monovalent or polyvalent phenols with aldehydes, especially formaldehyde, in the presence of acid catalysts), of diphenols obtained by the esterification of 2 mol of the sodium salt of an aromatic hydroxy carboxylic acid with 1 mol of a dihalogenated alkane or a dihalogenated dialkyl ester (see GB-PS No. 1 017 612), or of polyphenols obtained by the condensation of phenols with long chained halogenated paraffins containing at least two halogen atoms (see GB-PS No. 1 024 288).

Further examples include the glycidyl ethers of polybydric alcohols such as 1,4-butane diol, 1,6-hexane diol, glycerol or trimethylol propane, which may also be alkoxylated, and the glycidyl ethers of pentaerythritol and polyethylene glycols. Triglycidyl isocyanurate, N,N'-diepoxypropyloxamide and polyglycidyl thioethers of polyvalent thiols such as bis-mercaptomethyl benzene or diglycidyl-trimethylene trisulphone are also of interest.

The following may also be used: glycidyl esters of polyvalent aromatic, saturated or unsaturated, aliphatic or cycloaliphatic carboxylic acids; for example, diglycidyl phthalate, diglycidyl terephthalate, diglycidyl tetrahydrophthalate, diglycidyl adipate and diglycidyl hexahydrophthalate, any of which may be substituted by methyl groups, and glycidyl esters of reaction products of 1 mol of an aromatic or cycloaliphatic dicarboxylic acid anhydride and ½ mol of a diol or 1/n mol of a polyo0l containing hydroxyl groups, such as glycidyl carboxylic acid esters corresponding to the following general formula:

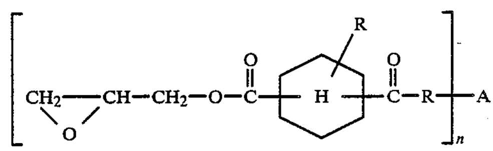

wherein A denotes a residue, which is at least divalent, of an aliphatic hydrocarbon group optionally interrupted by oxygen and/or cycloaliphatic rings, or the divalent residue of a cycloaliphatic hydrocarbon, R denotes hydrogen or alkyl groups with 1 to 3 carbon atoms and n stands for a number with a value from 2 to 6; or mixtures of glycidyl carboxylic acid esters corresponding to the above general formula (see GB-PS No. 1 220 702).

The preparation of suitable epoxide compounds and the reaction of these, compounds are disclosed in DOS No. 2 534 012 and DOS No. 2 631 949.

Reaction products obtained from polyesters which are free from oleic and fatty acids and optionally unsaturated and acrylic or methacrylic acids (=polyester acrylates), containing at least two double bonds per molecule, may be used as unsaturated prepolymers.

The polyesters used are preferably of the type which may be prepared by the polycondensation of alcohols and carboxylic acids by known processes as defined e.g. in Römpp's Chemielexikon, Volume 1, page 202, Frank'sche Verlagsbuchhandlung, Stuttgart, 1966 or described by D. H. Solomin in The Chemistry of Organic Filmformers, pages 75 to 101, John Wiley & Sons Inc., New York, 1967, and by H. Wagner and H. F. Sarx in Lackkunstharze, Carl Hanser Verlag, Munich, 1971, pages 96 to 113.

The acid components used for the synthesis of the polyesters are preferably aliphatic or cycloaliphatic, saturated or unsaturated, and/or aromatic, polybasic carboxylic acids, preferably di-, tri- and tetracarboxylic acids containing 2 to 14, preferably 4 to 12 carbon atoms per molecule, or their esterifiable derivatives (e.g. anhydrides or esters), e.g. phthalic acid anhydride, isophthalic acid, terephthalic acid, tetrahydro and hexahydrophthalic acid anhydride, endomethylene tetrahydrophthalic acid, succinic acid, sebacic acid, azelaic acid, trimellitic acid and trimellitic acid anhydride, pyromellitic acid anhydride, fumaric acid and maleic acid. Phthalic acid anhydride is the most commonly used acid component.

The alcohols used for the synthesis of the polyesters are preferably aliphatic, cycloaliphatic and/or araliphatic alcohols having from 1 to 15, preferably from 2 to 6 carbon atoms and from 1 to 6, preferably from 1 to 4 OH groups per molecule attached to non-aromatic carbon atoms, e.g. glycols such as ethylene glycol, propane diol-(1,2) and -(1,3), butane diol -(1,2), -(1,3) and -(1,4), 2-ethylpropane diol-(1,3), 2-ethylhexane diol-(1,3), neopentyl glycol, 2,2,4-trimethyl-pentane diol-(1,3), hexane diol(1,6), cyclohexane diol-(1,2) and -(1,4), 1,2- and 1,4-bis-(hydroxymethyl)-cyclohexane and adipic acid-bis-(ethylene glycol ester); ether alcohols such as di- and triethylene glycol and higher polyether alcohols, dipropylene glycol, alkoxylated bisphenols having two $C_2/C_3$ alkoxy groups per molecule, and perhydrogenated bisphenols; butane triol(1,2), hexane triol-(1,2,6), trimethylol propane, trimethylol hexane, glycerol, pentaerythritol, dipentaerythritol, mannitol and sorbitol; and monohydric alcohols with a chain breaking action containing 1 to 8 carbon atoms, such as propanol, butanol, cyclohexanol and benzyl alcohol. The most commonly used alcohols are glycerol, trimethylol propane, neopentyl glycol and pentaerythritol and their alkoxylation products.

The products of esterification of the above mentioned polyhydric alcohol components with acrylic and methacrylic acid may also be used, e.g. hexane diol diacrylate, trimethylol propane triacrylate, ethoxylated trimethylol propane triacrylate, tripropylene glycol diacrylate and glyceryl propoxy triacrylate.

Products of condensation of di- or polyisocyanates containing n free isocyanate groups with n mols of hydroxyalkyl (meth)acrylates are also suitable for the preparation of the dispersions according to the invention. These condensation products are obtained from aliphatic, cycloaliphatic and/or aromatic polyisocyanates such as tetramethylene diisocyanate, hexamethylene diisocyanate, 4,4'-dicyclohexylmethane diisocyanate, 4,4'-dicylcohexyldimethylmethane diisocyanate, isophorone diisocyanate, diphenylmethane diisocyanate, tolylene diisocyanate, naphthylene diisocyanate and 4,4'-diphenyl ether diisocyanate and optionally the dimers or trimers thereof or their products of reaction with minor quantities of hydrogen active compounds such as polyhydric alcohols and/or ether alcohols which have already been mentioned above and may contain ionic groups or polyfunctional amines and/or amino alcohols, by reacting the aforesaid compounds with acrylic acid esters containing hydroxyl groups, such as hydroxyethyl acrylate, hydroxypropyl acrylate and/or butane diol monoacrylate or the corresponding methacrylate compounds.

Compounds containing allyl ether groups, such as the diallyl and/or triallyl ethers of trimethylol propane, pentaerythritol and/or glycerol or allyl ether-modified polyesters may also be present during the preparation of the dispersion according to the invention.

The cellulose esters are preferably nitrocelluloses in any stages of viscosity or plasticised nitrocellulose or mixtures thereof. Nitrocellulose of the quality conventionally used as lacquer nitrocellulose is particularly suitable, i.e. cellulose nitric acid esters having a nitrogen content of from 10.2 to 12.6% by weight.

Conventional plasticisers may also be used, e.g. the esters of aliphatic monocarboxylic acids, such as cetyl acetate, glycol diacetate, glycerol triacetate, stearates and ricinic acetates; also, the esters of aromatic dicarboxylic acids, e.g. dibutyl phthalate or dioctyl phthalate, and the esters of aliphatic tricarboxylic acid, e.g. tributyl citrate, and of inorganic acids, e.g. tributyl phosphate and oils such as castor oil or linseed oil, as well as the ethoxylation and epoxydation products of the above mentioned compounds, e.g. ethoxylated castor oil or epoxidised soya bean oil.

Suitable emulsifiers for aqueous media used for the preparation of the dispersions according to the invention are described in "Emulsions: Theory and Practice", Paul Becker, Chapter 6, Reinhold Putlishing Corp., New York, (1965) and in McCutcheon's "Detergents and Emulsifiers, 1972 Annual", and "Tenside, Textilhilfsmittel, Waschrohstoffe", Dr. K. Lindner, Wissenschaftliche Verlagsgesellschaft, Stuttgart, 1964.

Examples include anion active substances, carboxylates such as fatty acid soaps (derived from lauric, stearic or oleic acid) and acyl derivatives of sarcosine (methyl glycine), sulphates such as sodium lauryl sulphate, sulphated natural oils and esters (Turkish red oil) and alkylaryl polyether sulphates, sulphonates such as alkylaryl polyether sulphonates, dodecylbenzene sulphonate and isopropyl naphthalene sulphonate and sulphosuccinate and sulphosuccinamates as well as phosphoric acid esters, e.g. long chained fatty alcohol partial esters of complex phosphates and orthophosphoric acid esters of polyethoxylated fatty alcohols.

Carboxylates, sulphates: sulphonates, phosphates, phosphites and phosphonates of nonionogenic surface active alkyl, aryl and alkyl glycol ethers, acylated and alkylated alkanol amino polyglycol ethers and copolymers of ethylene oxide and/or propylene oxide may also be used.

The above mentioned anion active substances may be in the form of their sodium, potassium, lithium, ammonium or amine salts. The sodium and ammonium salts are the most commonly used.

Lauryl ammonium sulphonic acid betaine is an example of an amphoteric substance.

Examples of nonionogenic substances include ethoxylated monohydric and polyhydric alcohols (i.e. the ethylene oxide derivatives of these alcohols), e.g. octyl and nonyl phenol derivatives, ethylene oxide/propylene oxide block copolymers, esters (e.g. glyceryl monostearate), ethoxylated oils such as products of ethoxylation of castor oil or soya bean oil, products of dehydration of sorbitol, e.g. sorbitan monostearate and polyethylene oxide sorbitan monolaurate, and lauric acid isopropanolamide.

Anion active and/or nonionogenic substances are most frequently used.

Colloids and high molecular weight stabilizers such as complex polysaccharides (Gum Arabic and Tragacanth), amylopectin, water soluble cellulose derivatives (e.g. sodium carboxymethyl cellulose, hydroxyethyl cellulose and hydroxypropyl cellulose), polyvinyl alcohol (e.g. in a partially saponified form), alginates and carageenan may also be used (either alone or in combInatIon with the surface active substances described above).

There is a comprehensive literature, including the references cited above, which deals with the correct choice of surface active agents and stabilizers. It is frequently necessary to resort to experiments. Typical proportions lie in the range of about 0.2 to 10% by weight.

The resins which are optionally used include commonly used resins such as alkyd, maleic acid, phenol formaldehyde, xylene formaldehyde, ketone, sulphonamide, aldehyde, amine and epoxy resins, carbamic acid esters, coumarone-indene resins, esters of saccharose, and vinyl and acrylate resins and their copolymerisation resins as described e.g. "Karsten-Lackrohstofftabellen", 8th Edition, Curt R. Vincentz Verlag, Hanover, 1987.

Thus, for example, separately prepared aqueous polyurethane emulsions may be used as polymerisation nuclei to which the substances mentioned above may be added.

The solvents optionally used may either be of the kind which can be distilled off azeotropically after the preparation of the product, e.g. esters such as methyl, ethyl or propyl acetate or ketones such as acetone or methylethyl ketone, or they may be of the kind which remain in the dispersion as coalescing agents, e.g. glycols, polyhydric alcohols, glycol ethers or glycol ether acetates.

Other known solvents may also be added as coalescing agents, depending on the intended field of application of the products (e.g. as lacquers for wood, metal, plastic, paper, leather, glass or films) but the concentration of solvent should not exceed 10% by weight. Substances which improve processing or the properties for application of the products in practice may also be added to the emulsion, preferably to the aqueous phase. Examples of such substances include slip agents, gloss improvers, levelling agents, pigments, dyes and fillers.

The aqueous dispersions according to the invention have excellent properties as protective coatings and decorative coverings on a wide variety of substances. Since the dispersions according to the invention are free from cloudiness after physical drying, e.g. on wood, they are capable of giving rise to surfaces which have the nitrocellulose typical staining and sandability.

Methods for the preparation of the aqueous emulsions are well known and have been described, for example, in Chapter 7 of the above mentioned book by Becker. Emulsification may be carried out by simply stirring all the components of the reaction mixture in the reaction vessel or by predissolving the polymer in the monomers and subsequently emulsifying the solution obtained. Emulsification may also be carried out by the ultrasound mixing method, the jet mixing method, the employment of mixers with a high shearing action or a combination of these methods. In a preferred embodiment, the liquid components are first introduced into the reaction vessel.

The time required for predissolving the polymer in the monomers depends to a great extent on the solubility of the polymer or polymers, the molecular weight and the quantitative proportions. It may vary from a few minutes to several days. Mixtures with a dissolving time of from 10 minutes to 5 hours are preferred.

The temperature may be kept constant during emulsification or it may be varied. It may be in the range of from 0° to 110° C. If the cellulose ester is predissolved in the monomers, a temperature of up to 150° C. may be employed. Temperatures of from 20° to 100° C. are preferred.

Emulsification may be carried out in any vessel but the reactor used for polymerisation is preferred. The system may be open (normal pressure) or closed. Pressure containers (autoclaves) are preferred. The pressure conditions during emulsification depend on the vapour pressure of the monomers and other additives and on the temperature employed.

Radical polymerisation converts the aqueous emulsion of cellulose ester and monomers into an aqueous polymer dispersion. The dispersion consists of a homogeneous mixture of particles composed of at least two polymers. She internal structure of the particles may be homogeneous or it may be characterised by a pronounced core/sheath structure. The particles may also show gradual changes in the composition in the radial direction. The difference between the core and the shell may be of a chemical nature (differing polymer and copolymer compositions) or a physical nature (differing molecular weights, tacticities, degrees of branching or cross-linking or glass temperatures).

The reaction mechanism of polymerisation may correspond to a suspension polymerisation or an emulsion polymerisation or both mechanisms may take place in parallel or in any sequence.

Polymerisation is preferably carried out in the same vessel as that in which the aqueous emulsion was prepared.

Pressure systems (autoclaves) are particularly preferred. Polymerisation is carried out at normal or elevated pressure, depending on the nature of the starting components. It has also been found advantageous to cover the reaction mixture with an inert gas.

The polymerisation may be carried out continuously, discontinuously or by the cascade principle. The reaction requires a radical forming initiator, which is added all at once or portionwise or continuously. It may be added solvent free or in an aqueous or organic solution.

Individual initiators or mixtures of several initiators may be used. Mixtures of initiators differing in their speed of decomposition and mixtures of water soluble and oil soluble initiators are preferred.

The polymerisation temperature lies in the range of from 0° to 180° C., preferably from room temperature to 100° C. The polymerisation time may vary from a few minutes to several hours and is preferably in the range of from 1 to 8 hours.

The core-shell structure may be built up by using monomers of differing reactivities or by the continuous or discontinuous addition of one or more monomers during or after an initial polymerisation of the reaction mixture initially introduced into the reaction vessel. The structure and properties of the particles of dispersion may thus be regulated as desired by the choice of monomers, the time at which they are added and their quantitative proportions.

The initiators used may be water soluble or oil soluble radical forming compounds. Examples of suitable water soluble compounds include sodium, potassium and ammonium persulphate and hydrogen peroxide. These may be used alone or together with reducing agents such as iron-II sulphate, sodium sulphite, sodium thiosulphate or ascorbic acid.

Examples of suitable oil soluble compounds include peroxides and hydroperoxides such as benzoyl peroxide, lauryl peroxide and cyclohexanone hydroperoxide, percabonates such as myristic percarbonate and azo compounds such as azo-bis-isobutyronitrile.

The proportions in which the initiators are used lie in the range of from 0.01 to 2% by weight, preferably from 0.01 to 0.5% by weight, based on the sum of the polymerisable compounds. The molecular weights may be limited in the usual manner by the addition of chain transferring and regulating agents.

The viscosity of the aqueous polymer dispersion is preferably in the range of from 2 to 1000 mPas, preferably from 5 to 500 mPas.

The average particle diameter is preferably in the range of from 0.01 to 10 μm, most preferably from 0.05 to 4 μm. The particle size distribution is generally monomodal. The solids content of the polymer dispersion is in the range of from 10 to 80% by weight, preferably from 20 to 60% by weight.

The dispersion may be converted into a powder by a suitable process such as freeze drying or spray drying.

EXAMPLE 1

224.4 g of butyl acrylate, 13.2 g of hexane diol diacrylate, 5 g of acrylic acid and 220 g of nitrocellulose of the standard type E 27 wetted with water (contains 146 g of anhydrous nitrocellulose) are introduced into a 1 liter glass reactor. After 1.5 hours stirring, an emulsion is prepared from the mixture by the dropwise addition of an emulsifier solution consisting of 17.6 g of sodium dodecyl benzene sulphonate, 8.8 g of alkylphenoxy poly(ethylenoxy)ethyl ester of phosphoric acid (Gafac ® RE 610), 0.5 g of defoamer and 5.3 g of $NaHCO_3$ in 360 ml of water. 0.44 g of $K_2S_2O_8$ in 20 g of $H_2O$ are added after the phase of emulsification. The reaction mixture is heated to the reaction temperature of 70° C. over a period of 1.5 hours with constant stirring. 52.8 g of butyl methacrylate and 0.44 g of $K_2S_2O_8$ dissolved in 20 ml of water are added after 4 hours to build up a core/shell structure. The reaction is completed after a further 4 hours at 70° C.

Solids content of the dispersion: 48% by weight. Average particle diameter: 0.3 μm (determined with a Master Sizer, Mutek GmbH).

EXAMPLE 2

Preparation of the dispersion was carried out as described in Example 1 but using 13.2 g of the reaction product of 1 mol of hexamethylene diisocyanate and 2 mol of hydroxyethyl acrylate instead of 13.2 g of hexane diol diacrylate.

Solids content of the dispersion: 48% by weight. Average particle diameter: 0.4 μm.

EXAMPLE 3

200 g of nitrocellulose standards type E 27, wetted with water (contains 130 g of anhydrous nitrocellulose) are added to the monomer mixture of 216 g of butyl acrylate, 24 g of hydroxyethyl acrylate, 5 g of acrylic acid and 36 g of an allyl ether-modified unsaturated polyester (Roskydal ® 850 N) and the mixture is stirred for 2 hours. The mixture is converted into an emulsion within 1.5 hours by the introduction of an emulsifier solution with stirring. The emulsifier solution consists of 16 g of sodium dodecyl benzene sulphonate, 8 g of alkylphenoxy poly(ethylenoxy) ethyl ester of pbosphoric acid (Gafac ® RE 610), 0.5 g of defoamer, 4.8 g of $NaHCO_3$ and 360 ml of water. The reaction mixture is heated to 70° C. in 30 minutes with stirring after the addition of 0.4 g of $K_2S_2O_8$. The further addition of 0.4 g of $K_2S_2O_8$ after 2 hours at 70° C. is followed by an after-reaction of 4 hours at the same temperature.

Solids content of the dispersion: 50.5% by weight. Average particle diameter: 0.37 μm.

EXAMPLE 4

0.6 g of azo-bis-isobutyronitrile are dissolved in a monomer mixture of 216 g of butyl acrylate, 24 g of hydroxy ethyl acrylate, 5 g of acrylic acid and 12 g of trimethylol propane triacrylate. The reaction mixture is stirred for 1 hour after the addition of 200 g of water wet: nitrocellulose, standard type E 27 (contains 130 g of anhydrous nitrocellulose). An emulsion is obtained within a further 1.5 hours by the introduction with stirring of an emulsifier mixture of 16 g of sodium dodecyl benzene sulphonate, 8 g of alkylphenoxy poly(ethylenoxy)-ethyl ester of phosphoric acid (Gafac ® RE 610) and 0.5 g of defoamer in a total of 400 ml of water.

After a heating up time of 1.5 hours, the temperature is maintained at 70° to 75° C. for 2 hours. Stirring is then continued for 4 hours at 70° C.

Solids content of the dispersion: 47.5% by weight. Average particle diameter: 0.38 μm.

EXAMPLE 5

480 g of water wet nitrocellulose standard type E 27 (contains 312 g of anhydrous NC) are added to 518 g of butyl acrylate, 58 g of hydroxyethyl acrylate, 12 g of acrylic acid, 29 g of hexane diol diacrylate and 1.4 g of azo-bis-isobutyronitrile in a 3 liter polymerisation vessel. The mixture is stirred for 1 hour. An emulsion is prepared by stirring the emulsifier mixture of 38.4 g of sodium dodecyl benzene sulphonate, 19.2 g of alkylphenoxy(ethylenoxy) ethyl ester of phosphoric acid (Gafac ® RE 610), 1.5 g of defoamer and 960 ml of water into the reaction mixture for 1.5 hours. The reaction mixture is then heated to 70° C. within 2 hours with stirring. 0.96 g of $K_2S_2O_8$ dissolved in 50 ml of water is added after 2 hours at 70° to 75° C. Stirring is then continued for a further 4 hours at 70° C.

Solids content of the dispersion: 42.5% by weight. Average particle diameter: 0.42 μm.

EXAMPLE 6

128.8 of nitrocellulose chips (containing 105 g of anhydrous nitrocellulose of standard type E 27 and 23.8 of dibutyl phthalate) are dissolved in a monomer mixture of 216 g of butyl acrylate, 24 g of hydroxyethyl acrylate, 12 g of hexane diol diacrylate and 5 g of acrylic acid. An emulsion is formed within 1.5 hours by stirring an emulsifier solution of 16 g of sodium dodecyl benzene sulphonate, 8 g of alkylphenoxy-(ethylenoxy) ethyl ester of phosphoric acid (Gafac ® RE 610), 0.5 g of defoamer and 410 ml of water into the reaction mixture.

After the addition of 0.4 g of $K_2S_2O_8$, the reaction mixture is heated to the reaction temperature of 70° C. with stirring. It is then kept within the temperature range of from 70° to 73° C. for 2 hours with constant stirring. 52.3 g of butyl acrylate, 0.5 g of trimethylol propane diacrylate and 0.5 g of $K_2S_2O_8$ dissolved in 20 ml of water are then added. The reaction temperature of 70° C. is kept constant for a further 2 hours.

Solids content of the dispersion: 49.6% by weight. Average particle diameter: 0.6 μm.

EXAMPLE 7

The procedure was the same as in Example 3 but the following components were used:

228 g of butyl acrylate.
12 g of ethoxylated glycerol triacrylate (OTA 480)
4 g of acrylic acid
16 g of dibutyl phthalate
200 g of water wet nitrocellulose, standard type E 27 (contains 130 g of anbydrous NC)

Solids content of the dispersion: 47% by weight. Average particle diameter: 0.3 μm.

COMPARISON EXAMPLE 1

Example 2 of DE-PS No. 2 529 547 was repeated. The 46% dispersion obtained was tested in the same manner as Examples 1 to 7 but no coalescing agent was added.

COMPARISON EXAMPLE 2

To demonstrate the influence of the compound of monomer group B according to the invention, Example 7 according to the invention was repeated but with replacement of the ethoxylated glycerol triacrylate by butyl acrylate.

Solids content of the dispersion: 47% by weight. Average particle diameter: 0.3 μm.

ASSESSMENT OF THE FILM PROPERTIES

To assess the hardness, the grindability and the appearance of the film, the dispersion obtained (without the addition of solvent) is applied to a glass plate to form a layer having a thickness of 150 μm when wet and the layer is dried at 80° C. for 30 minutes. After cooling, the pendulum hardness according to König is determined.

To assess the sandability, 20 rubbing down cycles were carried out with a FEK Veslic apparatus (manufacturers Kueny/Switzerland) and an abrasive paper having a grain of 220 applied under a pressure of 1000 g. The abrasive paper was then assessed visually. The sandability is very good if only a fine grinding dust is formed, which is not fixed to the abrasive paper. The sandability is poor if no fine grinding dust is formed but the abrasive paper becomes compacted (the lacquer material which has been rubbed off cannot be removed from the abrasive paper by brushing).

The optical appearance of the film was assessed visually.

The results are summarised in Table 1.

TABLE 1

Assessment of the film properties.

| Example | Pendulum Hardness according to Konig (sec) | Sandability | Appearance of the film |
|---|---|---|---|
| Example 1 | 66 | good | clear |
| Example 2 | 69 | very good | clear |
| Example 3 | 90 | very good | clear |
| Example 4 | 66 | good | clear |
| Example 5 | 80 | very good | clear |
| Example 6 | 55 | good | clear |
| Example 7 | 48 | satisfactory | clear |
| Comparison Example 1 | Not measurable* | Not measurable* | cloudy* |
| Comparison Example 2 | 39 | very poor | clear |

*The dispersion does not form a film.

We claim:

1. A polymer dispersion comprising an aqueous continuous phase and particles dispersed therein, said particles containing a cellulose ester and polymerised monomers, wherein I. at least 2 polymerized monomers A and B together with the cellulose ester are contained in the particles, II. A is a monomer having the following formula containing a polymerisable double bond:

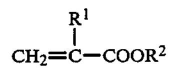

$$CH_2=C(R^1)-COOR^2$$

in which $R^1$ denotes a hydrogen atom or an alkyl group having 1 to 4 carbon atoms, $R^2$ denotes hydrogen, an alkyl group having 1 to 20 carbon atoms, a cycloalkyl group having 5 to 6 carbon atoms, a group of the formula $-(CHR^3-CHR^4-O)_n-R^5$, or aryl, $R^3$, $R^4$ and $R^5$ denote hydrogen or alkyl with 1 to 6 carbon atoms and n stands for an integer with a value from 1 to 50, III. B is a monomer having at least two polymerisable double bonds and IV. the dispersion contains at least one emulsifier.

2. Dispersion according to claim 1, wherein the particles consist of a core and at least one shell wherein the shell composition differs from that of the core.

3. Dispersion according to claim 2, wherein cellulose esters, polymerised monomers B and at least part of the polymerised monomers A are homogeneously distributed in the core of the particles.

4. Dispersion according to claim 2, wherein the ratio of the polymerised monomer A to the polymerized monomer B is greater in at least one shell of the particles than in the core of the particle.

5. Dispersion according to claim 1, wherein the cellulose ester is cellulose nitrate.

6. Dispersion according to claim 1, wherein the dispersion contains from 5 to 40 parts by weight of cellulose ester, from 5 to 55 parts by weight of polymerised monomers A, from 0.1 to 30 parts by weight of polymerised monomers B, from 0.2 to 10 parts by weight of emulsifiers, at least 30 parts by weight of water, from 0 to 10 parts by weight of a resin, from 0 to 25 parts by weight of a plasticizer, from 0 to 10 parts by weight of an organic solvent.

7. Dispersion according to claim 1, wherein $R^2$ denotes an alkyl group with 3 to 6 carbon atoms containing at least one OH group.

8. Process for the preparation of a dispersion according to claim 1, comprising polymerizing the monomers A and B in an aqueous phase in the presence of a cellulose ester and at least one emulsifier.

9. A lacquer composition comprising lacquer additives and a dispersion according to claim 1.

10. Dispersion according to claim 1, wherein monomer B containing more than one polymerisable double bond is an epoxy poly(meth)acrylate, polyester poly(meth)acrylate, a polyurethane poly(meth)acrylate or an allyl ethermodified compound.

* * * * *